United States Patent
Sugae et al.

(10) Patent No.: US 11,719,815 B2
(45) Date of Patent: Aug. 8, 2023

(54) OBJECT DETECTION DEVICE

(71) Applicant: AISIN CORPORATION, Kariya (JP)

(72) Inventors: Ippei Sugae, Kariya (JP); Koichi Sassa, Kariya (JP)

(73) Assignee: AISIN CORPORATION, Kariya (JP)

(*) Notice: Subject to any disclaimer, the term of this patent is extended or adjusted under 35 U.S.C. 154(b) by 79 days.

(21) Appl. No.: 17/202,633

(22) Filed: Mar. 16, 2021

(65) Prior Publication Data

US 2021/0318431 A1 Oct. 14, 2021

(30) Foreign Application Priority Data

Apr. 8, 2020 (JP) ................. 2020-069571

(51) Int. Cl.
| | | |
|---|---|---|
| *G01S 15/93* | (2020.01) | |
| *G01S 15/10* | (2006.01) | |
| *G01S 15/04* | (2006.01) | |
| *G01S 15/931* | (2020.01) | |

(52) U.S. Cl.
CPC ........... *G01S 15/931* (2013.01); *G01S 15/04* (2013.01); *G01S 15/104* (2013.01)

(58) Field of Classification Search
CPC ... G01S 15/08; G01S 15/931; G01S 2015/938
See application file for complete search history.

(56) References Cited

U.S. PATENT DOCUMENTS

| | | | | |
|---|---|---|---|---|
| 4,884,192 A * | 11/1989 | Terada | ................. | G06F 15/8015 709/251 |
| 6,628,227 B1 * | 9/2003 | Rao | ........................ | G01S 15/876 342/70 |
| 6,680,689 B1 * | 1/2004 | Zoratti | .................... | B60Q 9/008 340/436 |
| 7,545,956 B2 * | 6/2009 | Miyahara | ................. | G01S 15/86 382/106 |
| 9,542,845 B1 * | 1/2017 | Mayer | ....................... | G08G 1/04 |
| 9,616,814 B1 * | 4/2017 | Chiang | .................. | G01S 15/931 |
| 9,734,744 B1 * | 8/2017 | McGie | ............. | G08G 1/096741 |
| 9,791,557 B1 * | 10/2017 | Wyrwas | ................... | G01S 17/42 |
| 9,824,337 B1 * | 11/2017 | Rodoni | .................... | G06Q 10/30 |
| 2005/0135190 A1 | 6/2005 | Katou et al. | | |
| 2014/0240167 A1 * | 8/2014 | Cho | ........................ | G08G 1/052 342/104 |

(Continued)

FOREIGN PATENT DOCUMENTS

| | | |
|---|---|---|
| JP | 2005-249770 A | 9/2005 |
| JP | 2006-292597 A | 10/2006 |
| JP | 2021-001811 A | 1/2021 |

*Primary Examiner* — Daniel L Murphy
*Assistant Examiner* — Amie M Ndure
(74) *Attorney, Agent, or Firm* — Sughrue Mion, PLLC

(57) ABSTRACT

An object detection device includes: a transmission unit configured to transmit a transmission wave; a reception unit configured to receive a reception wave, which is the transmission wave reflected by and returned from an object, until a predetermined measurement time elapses after the transmission wave is transmitted; a detection unit configured to detect the object based on distance information based on the reception wave received by the reception unit; and a reception control unit configured to set the measurement time after the detection of the object to be shorter than the measurement time after a non-detection of the object.

8 Claims, 9 Drawing Sheets

(56) References Cited

U.S. PATENT DOCUMENTS

| | | | |
|---|---|---|---|
| 2017/0028986 A1* | 2/2017 | Kuroda | G01S 17/86 |
| 2017/0153329 A1* | 6/2017 | Kodama | G01S 17/42 |
| 2020/0238993 A1* | 7/2020 | Urano | G05D 1/0061 |
| 2020/0400816 A1 | 12/2020 | Sugae | |
| 2021/0055401 A1* | 2/2021 | Takayama | G01S 7/4056 |
| 2021/0163014 A1* | 6/2021 | Kimura | B60W 50/14 |
| 2021/0165012 A1* | 6/2021 | Kimura | G01P 3/44 |
| 2021/0221401 A1* | 7/2021 | Komori | B60W 30/16 |

\* cited by examiner

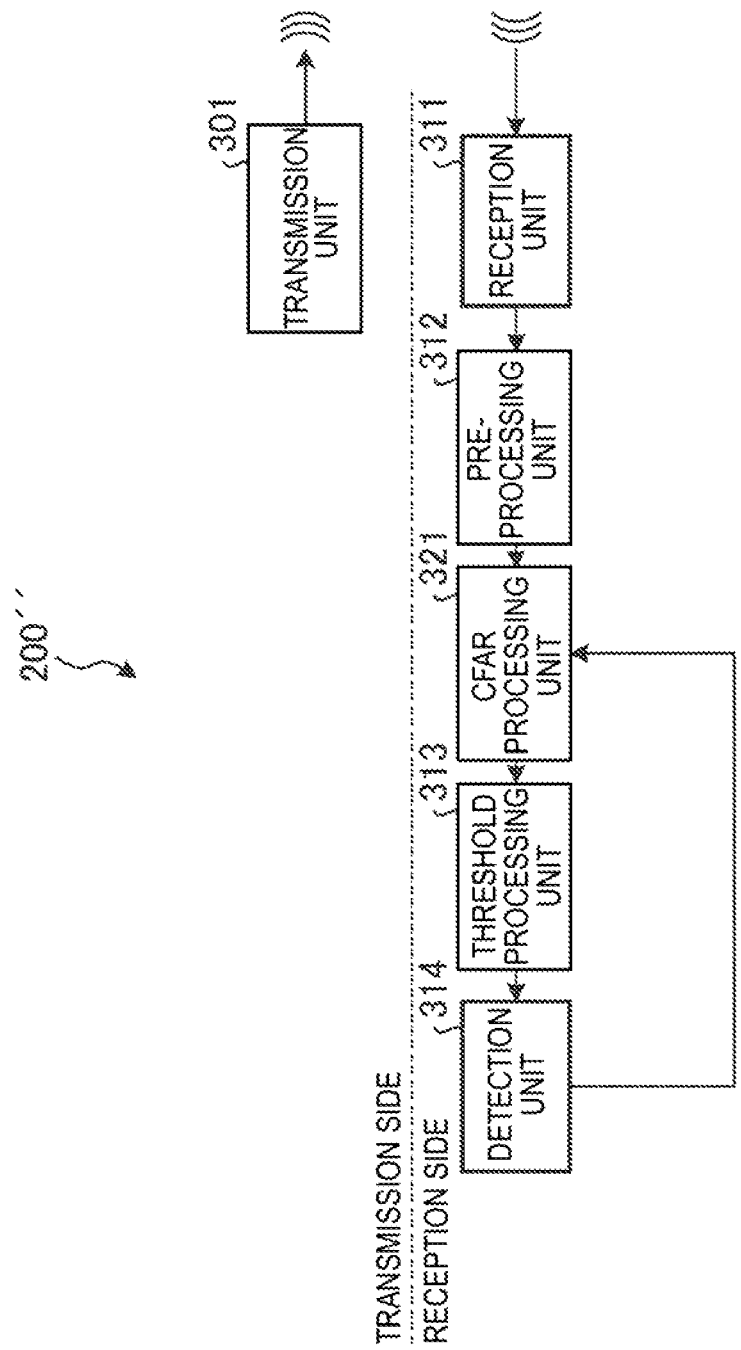

OBJECT DETECTION DEVICE

CROSS REFERENCE TO RELATED APPLICATIONS

This application is based on and claims priority under 35 U.S.C. § 119 to Japanese Patent Application 2020-069571, filed on Apr. 8, 2020, the entire content of which is incorporated herein by reference.

TECHNICAL FIELD

This disclosure relates to an object detection device.

BACKGROUND DISCUSSION

In a device for detecting a distance to an object or the like, a time of flight (TOF) method is used. The TOF method is a technique of calculating the distance to an object based on a difference between a timing at which a transmission wave such as an ultrasonic wave is transmitted and a timing at which a reception wave serving as a reflected wave, which is obtained by the transmission wave being reflected by and returned from the object, is received.

In a device for detecting an object using the TOF method, a technique of performing a quadrature demodulation on a reception signal using a sine wave signal synchronized with a burst pulse signal is disclosed (Reference 1 (JP 2005-249770A)). A technique related to constant false alarm rate (CFAR) processing for preventing an influence of a clutter by subtracting a moving average value from a reception signal is disclosed (Reference 2 (JP 2006-292597A)).

In the TOF method, the shorter the detection cycle from an acquisition of a detection result (TOF, distance, and the like) to an acquisition of a next detection result, the larger the number of the detection results (the number of samples) that can be acquired per unit time is, and therefore detection accuracy can be improved. However, in the related art, since an optimization of a measurement time from the transmission of the transmission wave to the reception of the reception wave and a processing time required for the processing for the reception wave is insufficient, the detection cycle may be unnecessarily long.

A need thus exists for an object detection device which is not susceptible to the drawback mentioned above.

SUMMARY

An object detection device as an example of this disclosure includes: a transmission unit configured to transmit a transmission wave; a reception unit configured to receive a reception wave, which is the transmission wave reflected by and returned from an object, until a predetermined measurement time elapses after the transmission wave is transmitted; a detection unit configured to detect the object based on distance information based on the reception wave received by the reception unit; and a reception control unit configured to set the measurement time after the detection of the object to be shorter than the measurement time after a non-detection of the object.

An object detection device as another example of this disclosure includes: a transmission unit configured to transmit a transmission wave; a reception unit configured to receive a reception wave which is the transmission wave reflected by and returned from an object; a detection unit configured to detect the object based on distance information based on the reception wave received by the reception unit; and a CFAR processing unit configured to perform CFAR processing using an average value of a plurality of signal values corresponding to a predetermined moving average time for a signal corresponding to the reception wave received by the reception unit and set the moving average time after a detection of the object to be shorter than a moving average time after a non-detection of the object.

BRIEF DESCRIPTION OF THE DRAWINGS

The foregoing and additional features and characteristics of this disclosure will become more apparent from the following detailed description considered with the reference to the accompanying drawings, wherein:

FIG. 12 is a block diagram showing an example of a function configuration of an object detection device according to a third embodiment.

DETAILED DESCRIPTION

Hereinafter, embodiments disclosed here will be described with reference to the drawings. Configurations of the embodiments described below and actions and effects provided by the configurations are merely examples, and are not limited to the following description.

First Embodiment

Figure 1:
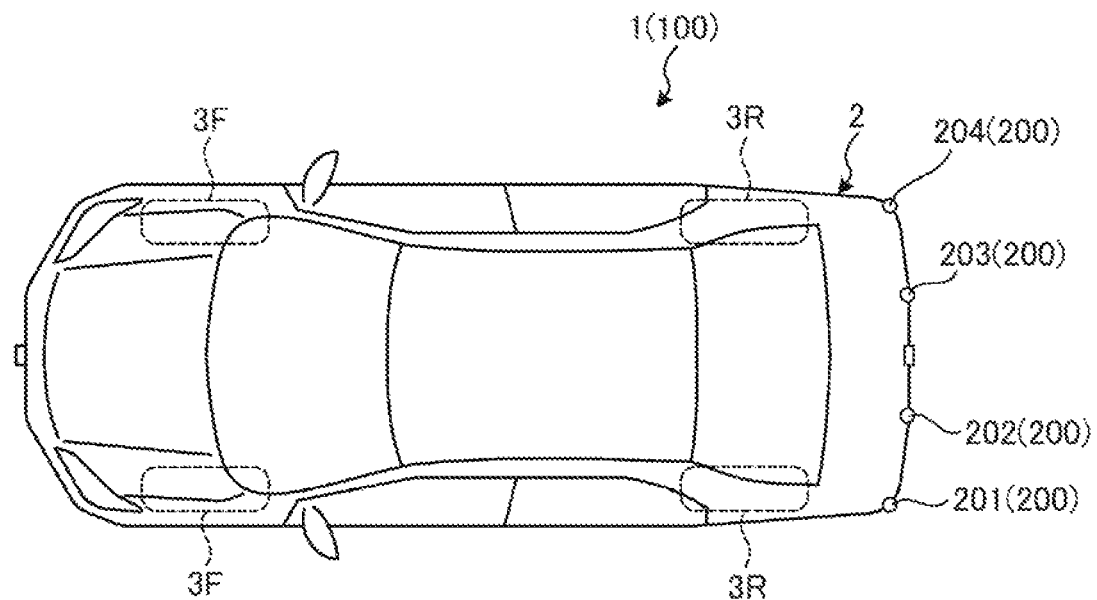
FIG. 1 is a top view showing an example of an external appearance of a vehicle including an object detection system according to a first embodiment.

FIG. 1 is a top view showing an example of an external appearance of a vehicle 1 including an object detection system according to a first embodiment. The object detection system exemplified below is a system that transmits and receives a sound wave (ultrasonic wave) and the like, and detects information (a distance to an object, presence or absence of an object, and the like) on an object (another vehicle, an obstacle on a road, a person, an animal, and the like) present around the vehicle 1 based on information such as a time difference (TOF) between the transmission and reception.

As shown in FIG. 1, the object detection system includes an electronic control unit (ECU) 100 mounted inside the four-wheel vehicle 1 including a pair of front wheels 3F and a pair of rear wheels 3R, and object detection devices 201 to 204 mounted on an exterior of the vehicle 1.

In the example shown in FIG. 1, the object detection devices 201 to 204 are provided at different positions on a rear end portion (for example, a rear bumper) of a vehicle body 2 serving as the exterior of the vehicle 1.

In the first embodiment, hardware configurations and functions of the object detection devices 201 to 204 are the same as each other. Therefore, in the following description, the object detection devices 201 to 204 may be collectively referred to as object detection devices 200 for simplification.

In the present embodiment, setting positions of the object detection devices 200 are not limited to the example shown in FIG. 1. The object detection devices 200 may be provided on a front end portion (for example, a front bumper) of the vehicle body 2, may be provided on a side surface portion of the vehicle body 2, or may be provided on two or more of a rear end portion, the front end portion, and the side surface portion. The number of the object detection devices 200 is not limited to the example shown in FIG. 1.

Figure 2:
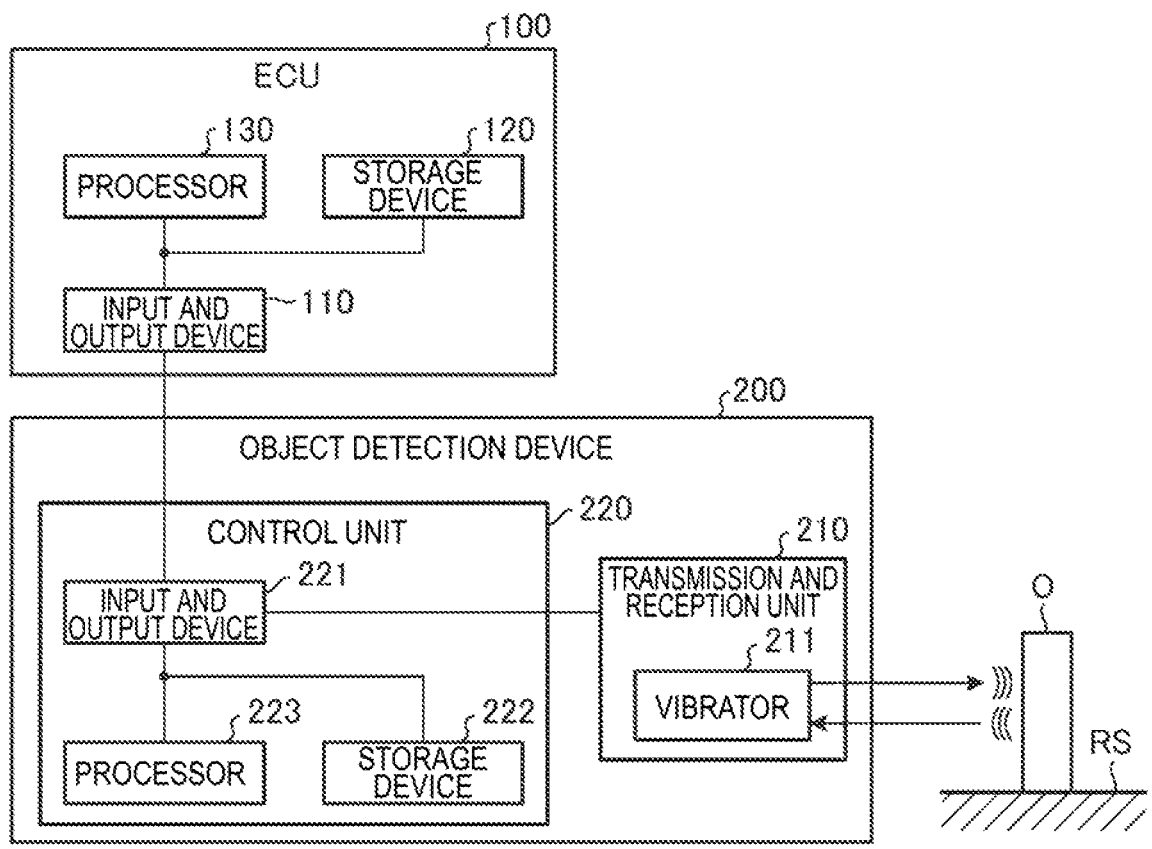
FIG. 2 is a block diagram showing an example of a hardware configuration of an ECU and an object detection device according to the first embodiment.

FIG. 2 is a block diagram showing an example of a hardware configuration of the ECU 100 and the object detection device 200 according to the first embodiment.

As shown in FIG. 2, the ECU 100 has a hardware configuration similar as that of a normal computer. More specifically, the ECU 100 includes an input and output device 110, a storage device 120, and a processor 130.

The input and output device 110 is an interface that implements transmission and reception of information between the ECU 100 and an outside (the object detection device 200 in the example shown in FIG. 1).

The storage device 120 includes a main storage device such as a read only memory (ROM) and a random access memory (RAM), and/or an auxiliary storage device such as a hard disk drive (HDD) and a solid state drive (SSD).

The processor 130 manages various types of processing executed by the ECU 100. The processor 130 includes an arithmetic device, for example, a central processing unit (CPU). The processor 130 reads and executes a program stored in a storage device 120, thereby implementing various functions, for example, automatic driving and alarm output.

The object detection device 200 includes a transmission and reception unit 210 and a control unit 220.

The transmission and reception unit 210 includes a vibrator 211 such as a piezoelectric element, and the transmission and reception of the ultrasonic waves are implemented by the vibrator 211.

More specifically, the transmission and reception unit 210 transmits, as a transmission wave, an ultrasonic wave generated in accordance with vibration of the vibrator 211, and receives, as a reception wave, the vibration of the vibrator 211 caused by the ultrasonic wave transmitted as the transmission wave being reflected by and returned from an object present outside. In the example shown in FIG. 2, an obstacle O provided on the road surface RS is exemplified as an object that reflects the ultrasonic wave from the transmission and reception unit 210.

Although in the example shown in FIG. 2, a configuration is exemplified in which both the transmission of the transmission wave and the reception of the reception wave are implemented by the single transmission and reception unit 210 including the single vibrator 211, the embodiment is not limited thereto. For example, a configuration on a transmission side and a configuration on a reception side may be separated such that, for example, a first vibrator for transmitting the transmission wave and a second vibrator for receiving the reception wave are separately provided.

The control unit 220 has a hardware configuration similar as that of a normal computer. More specifically, the control unit 220 includes an input and output device 221, a storage device 222, and a processor 223.

The input and output device 221 is an interface that implements transmission and reception of information between the control unit 220 and an outside (the ECU 100 and the transmission and reception unit 210 in the example shown in FIG. 2).

The storage device 222 includes a main storage device such as a ROM and a RAM, and/or an auxiliary storage device such as an HDD and an SSD.

The processor 223 manages various types of processing executed by the control unit 220. The processor 223 includes an arithmetic device, for example, a CPU. The processor 223 reads and executes a program stored in a storage device 333, thereby implementing various functions.

The object detection device 200 according to the present embodiment detects a distance to an object (for example, the obstacle O) according to a technique referred to as a so-called TOF method. As described in detail below, the TOF method is a technique of calculating a distance to an object base on a difference between a timing at which the transmission wave is transmitted (more specifically, a transmission is started) and a timing at which the reception wave is received (more specifically, a reception is started).

Figure 3:
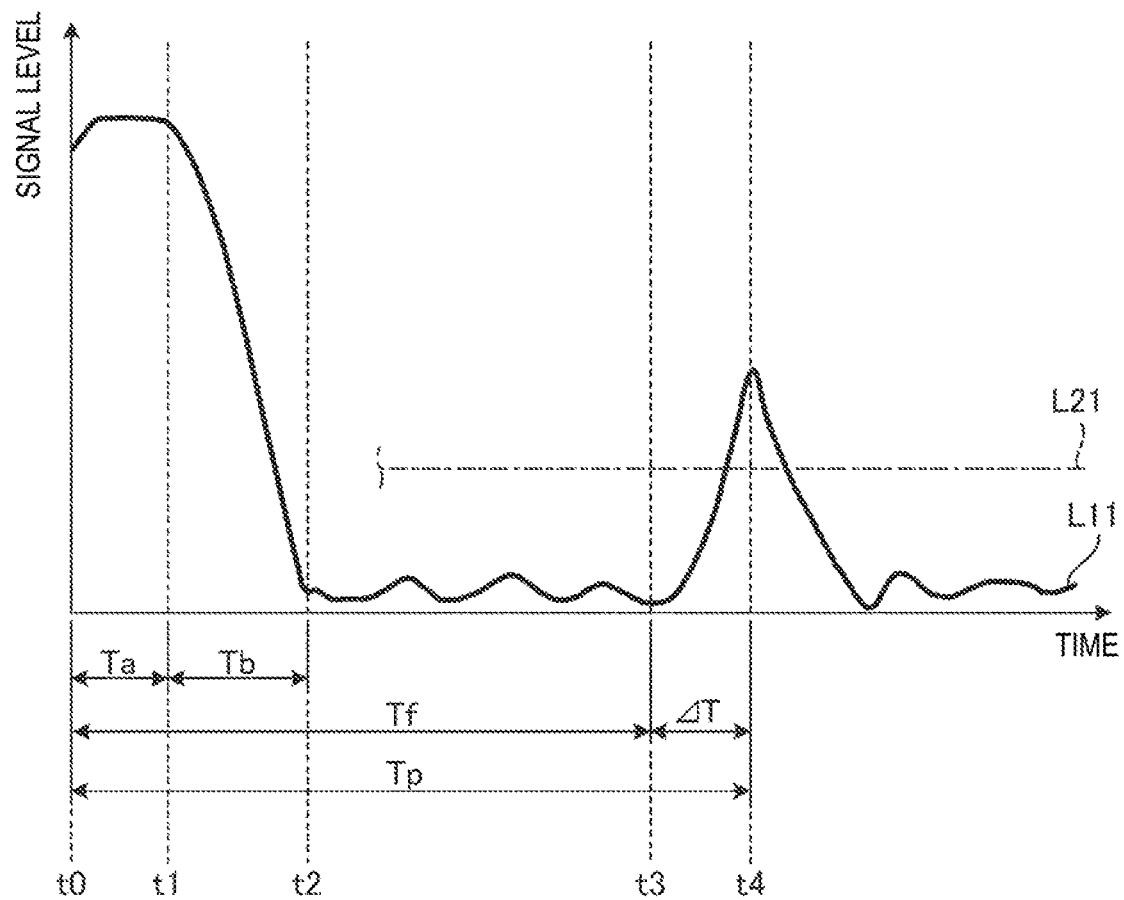
FIG. 3 shows an outline of a TOF method.

FIG. 3 shows an outline of the TOF method. Specifically, FIG. 3 is an exemplary and schematic view that shows, in a graph form, a temporal change in a signal level (for example, amplitude) of the ultrasonic wave transmitted and received by the object detection device 200 according to the present embodiment. In the graph shown in FIG. 3, a horizontal axis corresponds to a time, and a vertical axis corresponds to a signal level of a signal transmitted and received by the object detection device 200 via the transmission and reception unit 210 (the vibrator 211).

In the graph shown in FIG. 3, a solid line L11 represents an example of an envelope curve representing a temporal change in the signal level of the signal transmitted and received by the object detection device 200, that is, in a vibration degree of the vibrator 211. Based on the solid line L11, it can be read that by the vibrator 211 being driven and vibrating for a time Ta from a timing t0, the transmission of the transmission wave is completed at a timing t1, and then during a time Tb until a timing t2, the vibration of the vibrator 211 due to inertia continues while attenuating. Therefore, in the graph shown in FIG. 3, the time Tb corresponds to a so-called reverberation time.

The solid line L11 reaches a peak at which the vibration degree of the vibrator 211 exceeds (or equal to or more than) a predetermined threshold represented by a one-dot chain line L21 at a timing t4. At the timing t4, a time Tp elapses from the timing t0 at which the transmission of the transmission wave is started. The threshold is a value set in advance for identifying whether the vibration of the vibrator 211 is caused by reception of a reception wave serving as a transmission wave reflected by and returned from an object to be detected (for example, the obstacle O shown in FIG. 2) or is caused by reception of a reception wave serving as a transmission wave reflected by and returned from an object not to be detected (for example, the road surface RS shown in FIG. 2).

Although FIG. 3 shows an example in which the threshold represented by the one-dot chain line L21 is set as a constant value that does not change over time, the threshold may be set as a value that changes over time.

Here, it can be considered that the vibration having a peak exceeding (or equal to or more than) the threshold represented by the one-dot chain line L21 is caused by the reception of the reception wave serving as the transmission wave reflected by and returned from the object to be detected. On the other hand, the vibration having a peak equal to or lower than (or less than) the threshold value can be considered to be caused by the reception of the reception wave as the transmission wave reflected by and returned from the object not to be detected.

Therefore, based on the solid line L11, it can be read that the vibration of the vibrator 211 at the timing t4 is caused by the reception of the reception wave serving as the transmission wave reflected by and returned from the object to be detected.

In the solid line L11, the vibration of the vibrator 211 is attenuated after the timing t4. Therefore, the timing t4 corresponds to a timing at which the reception of the reception wave serving as the transmission wave reflected by and returned from the object to be detected is completed, in other words, a timing at which the last transmission wave transmitted at the timing t1 returns as the reception wave.

In the solid line L11, a timing t3 serving as a start point of the peak at the timing t4 corresponds to a timing at which the reception of the reception wave serving as the transmission wave reflected by and returned from the object to be detected is started, in other words, a timing at which the first transmission wave transmitted at the timing t0 returns as the reception wave. Therefore, in the solid line L11, a time ΔT between the timing t3 and the timing t4 is equal to the time Ta serving as a transmission time of the transmission wave.

Based on the above, in order to obtain a distance to the object to be detected according to the TOF method, it is necessary to obtain a time Tf between the timing t0 at which the transmission wave starts to be transmitted and the timing t3 at which the reception wave starts to be received. The time Tf can be obtained by subtracting the time ΔT equal to the time Ta serving as the transmission time of the transmission wave from a time Tp serving as the difference between the timing t0 and the timing t4 at which the signal level of the reception wave reaches the peak exceeding the threshold.

The timing t0 at which the transmission wave starts to be transmitted can be easily specified as a timing at which the object detection device 200 starts operating, and the time Ta serving as the transmission time of the transmission wave is determined in advance by performing setting or the like. Therefore, in order to obtain the distance to the object to be detected according to the TOF method, it is important to specify the timing t4 at which the signal level of the reception wave reaches the peak exceeding the threshold value. Then, in order to specify the timing t4, it is important to accurately detect a reception wave serving as a transmission wave reflected by and returned from an object to be detected.

Figure 4:
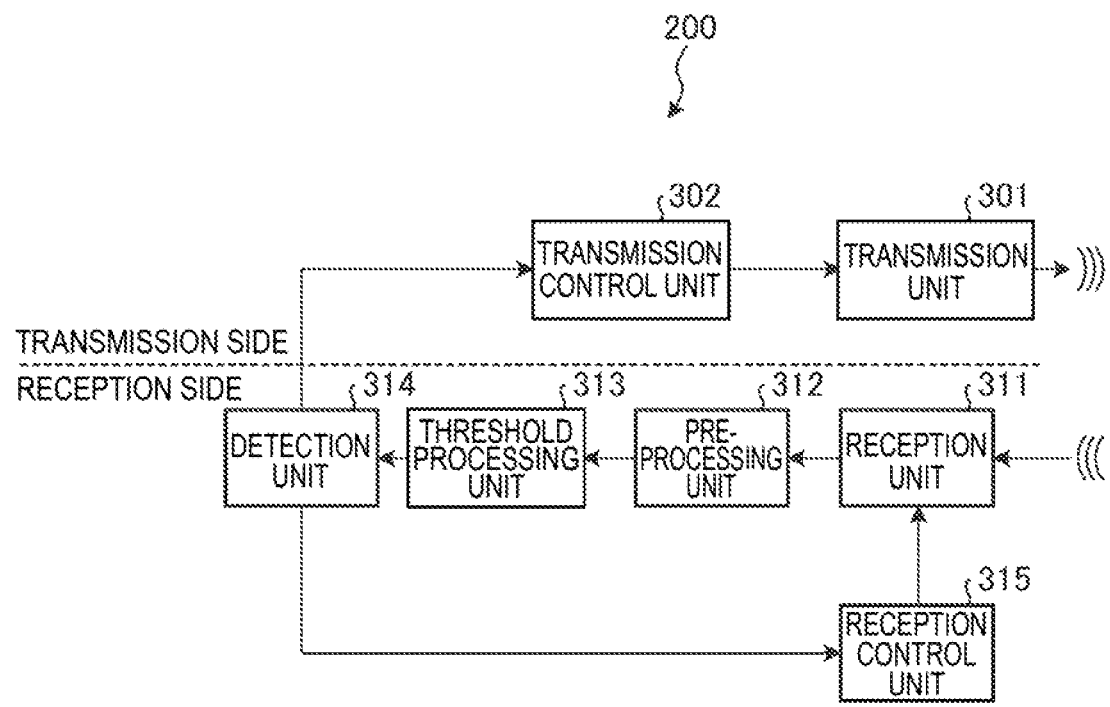
FIG. 4 is a block diagram showing an example of a function configuration of the object detection device according to the first embodiment.

FIG. 4 is a block diagram showing an example of a function configuration of the object detection device 200 according to the first embodiment. Although in an example shown in FIG. 4, the configuration on the transmission side and the configuration on the reception side are separated, such an aspect shown in the drawings is merely for convenience of description. In the present embodiment, as described above, both the transmission of the transmission wave and the reception of the reception wave are implemented by the single transmission and reception unit 210 including the single vibrator 211. However, as described above, it is also applicable that the configuration on the transmission side and the configuration on the reception side are separated.

As shown in FIG. 4, the object detection device 200 includes, as a configuration of the transmission side, a transmission unit 301 and a transmission control unit 302. The object detection device 200 includes, as a configuration of the reception side, a reception unit 311, a pre-processing unit 312, a threshold processing unit 313, a detection unit 314 and a reception control unit 315.

In the present embodiment, at least a part of the configuration shown in FIG. 4 may be implemented by dedicated hardware (analog circuit), and a remaining part of the configuration may be implemented as a result of cooperation between hardware and software, more specifically, as a result of the processor 223 of the object detection device 200 reading a program from the storage device 222 and executing the program. In the present embodiment, in the configurations shown in FIG. 4, the operation may be under control of the control unit 220 of the object detection device 200 itself, or may be under control of the external ECU 100.

First, the configuration of the transmission side will be described.

The transmission unit 301 transmits a transmission wave to an outside by vibrating the above-described vibrator 211 at a predetermined transmission interval. The transmission interval is a time interval from the transmission of the transmission wave to a next transmission of the transmission wave. The transmission unit 301 may be implemented using, for example, a circuit that generates a carrier wave, a circuit that generates a pulse signal corresponding to identification information to be given to the carrier wave, a multiplier that modulates the carrier wave according to the pulse signal, an amplifier that amplifies a transmission signal output from the multiplier, and the like.

The transmission control unit 302 controls the transmission interval based on a detection result (the distance to the object, the presence or absence of the object, and the like) by the detection unit 314 to be described later. Specifically, the transmission control unit 302 sets the transmission interval after the detection of the object to be shorter than the transmission interval after a non-detection of the object. The transmission unit 301 transmits a transmission wave based on the transmission interval controlled (set) by the transmission control unit 302.

Next, the configuration of the reception side will be described.

The reception unit 311 receives the reception wave, which is obtained by the transmission wave transmitted from the transmission unit 301 being reflected by and returned from the object, until a predetermined measurement time elapses after the transmission wave is transmitted. The measurement time is a standby time set for receiving the reception wave serving as a reflected wave of a transmission wave after the transmission wave is transmitted.

The pre-processing unit 312 performs pre-processing for generating an envelope curve indicating a similarity between the transmission wave and the reception wave received by the reception unit 311. The pre-processing may include, for example, amplification processing of amplifying a reception signal corresponding to the reception wave, filter processing of reducing noise contained in the amplified reception signal, correlation processing of acquiring a correlation value indicating the similarity between the transmission signal and the reception signal, and envelope curving processing of generating an envelope curve of a waveform indicating a temporal change of a correlation value signal based on the correlation value.

Then, the threshold processing unit 313 performs threshold processing of determining whether the transmission wave and the reception wave are similar to each other at a predetermined level or higher based on a comparison result of a value of the envelope curve generated by the pre-processing unit 312 and a threshold.

The detection unit 314 detects an object based on the TOF (distance information) based on the reception wave received by the reception unit. Based on a processing result by the threshold processing unit 313, the detection unit 314 according to the present embodiment specifies a timing at which the similarity between the transmission wave and the reception wave has a predetermined level or higher, that is, a timing (for example, the timing t4 in FIG. 2) at which the signal level of the reception wave reaches a peak exceeding the threshold value, and detects the distance to the object (including a presence or absence of the object) according to the TOF method.

The reception control unit 315 controls the measurement time based on the detection result by the detection unit 314. Specifically, the reception control unit 315 sets the measurement time after the detection of the object to be shorter than the measurement time after the non-detection of the object. The reception unit 311 receives a reception wave based on the measurement time set by the reception control unit 315.

Figure 5:
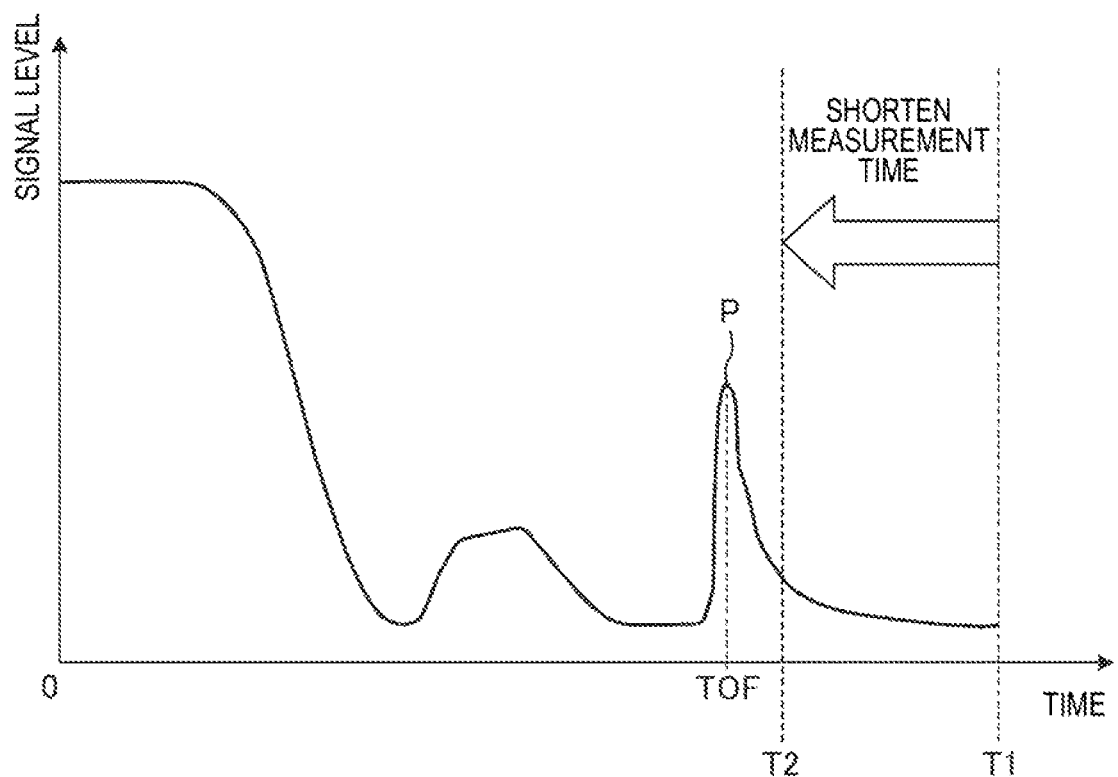
FIG. 5 shows an example of control of a measurement time by a reception control unit according to the first embodiment.

FIG. 5 shows an example of control of the measurement time by the reception control unit 315 according to the first embodiment. In the graph shown in FIG. 5, a horizontal axis corresponds to a time, and a vertical axis corresponds to a signal level of the reception signal. In FIG. 5, the reference measurement time T1, the shortened measurement time T2, a peak P corresponding to the object, and a TOF corresponding to the peak P are shown.

When the peak P corresponding to the object is detected by the detection unit 314 in a certain detection cycle, the reception control unit 315 according to the present embodiment shortens the measurement time in a next detection cycle based on the TOF corresponding to the peak P. In the example shown in FIG. 5, the measurement time is shortened from the reference measurement time T1 to the measurement time T2 that is longer than the TOF corresponding to the nearest present object (peak P) by a predetermined time. As the measurement time is shortened, the transmission control unit 302 shortens the transmission interval.

In an object detection system or the like mounted on a vehicle 1, it may be sufficient if the closest object can be detected, and it is often less necessary to extend a detection range to a region farther than the object. Accordingly, as described above, waste of the detection cycle can be reduced by shortening the measurement time based on the position of the object after the detection of the object. The detection cycle for a region closer than the detected object can be accelerated, and detection accuracy in the region can be improved.

Although the above-described predetermined time (the difference between the TOF and the measurement time T2) is a value to be appropriately set according to a usage environment, the performance of the vibrator 211, and the like, the above-described predetermined time is preferable to be, for example, a time corresponding to a distance of less than 1 m.

Figure 6:
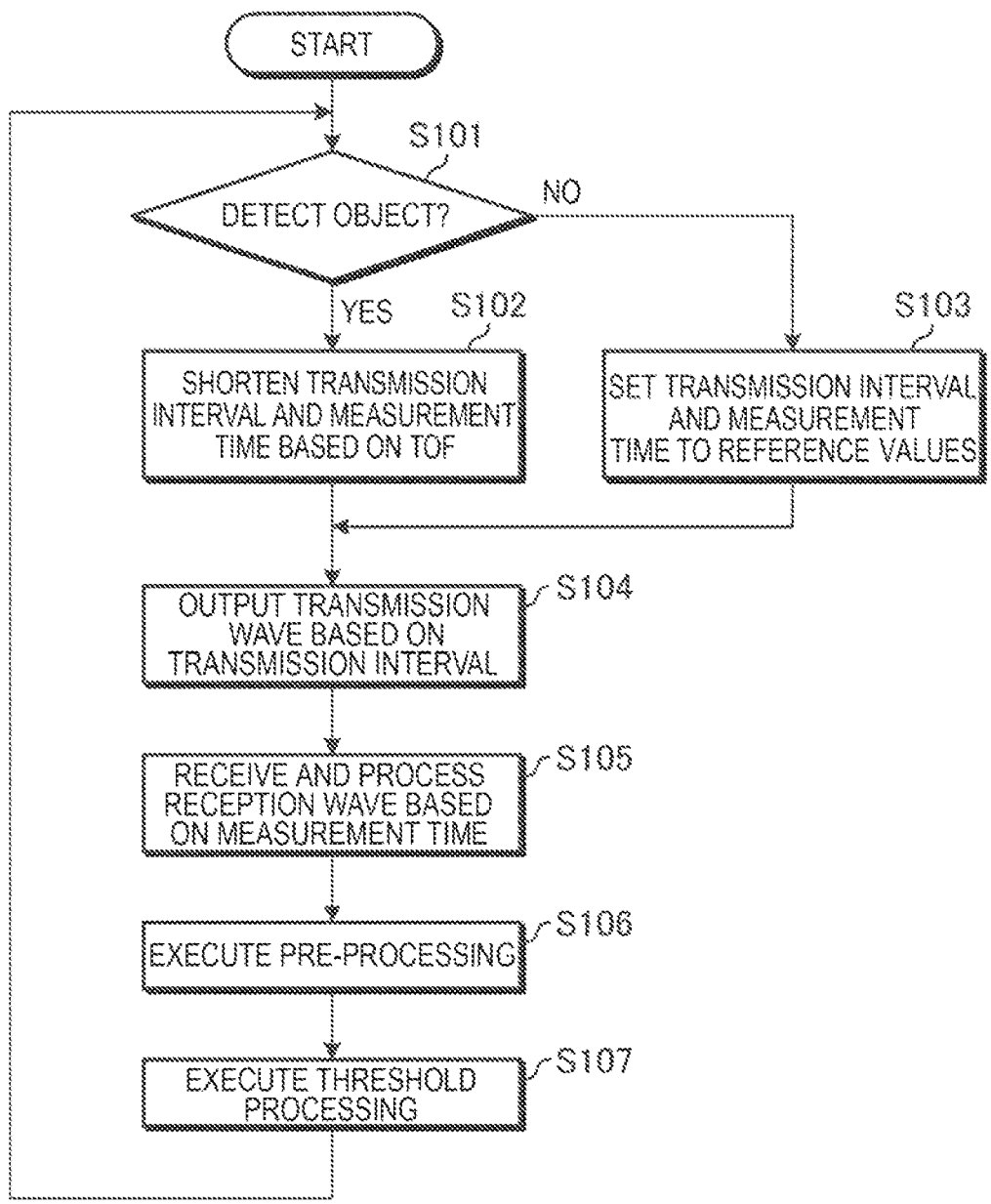
FIG. 6 is a flowchart showing an example of processing of the object detection device according to the first embodiment.

FIG. 6 is a flowchart showing an example of processing of the object detection device 200 according to the first embodiment. When the detection unit 314 detects an object (TOF corresponding to the object) (S101: Yes), the transmission control unit 302 shortens the transmission interval based on the TOF corresponding to the object, and the reception control unit 315 shortens the measurement time based on the TOF (S102). On the other hand, when no object is detected (S102: No), the transmission control unit 302 sets the transmission interval to a reference value, and the reception control unit 315 sets the measurement time to a reference value (T1) (S103).

The transmission unit 301 outputs the transmission wave based on the shortened transmission interval set in step S102, or the transmission interval serving as the reference value set in step S103 (S104). The reception unit 311 receives the reception wave based on the shortened measurement time (T2) set in step S102 or the measurement time (T1) serving as the reference value set in step S103 (S105).

Thereafter, the pre-processing unit 312 executes pre-processing on the reception signal corresponding to the measurement time (T1 or T2) set as described above (S106), and the threshold processing unit 313 executes threshold processing on the reception signal after the pre-processing by the pre-processing unit 312 (S107). The detection unit 314 detects an object based on the result of the threshold processing by the threshold processing unit 313 (S101).

According to the embodiment described above, the detection cycle for detecting an object can be optimized, and detection accuracy in a region (for example, a region closer than a detected object) in which it is highly necessary to detect an object can be improved.

Hereinafter, other embodiments will be described with reference to the drawings, and the same reference numerals are given to portions having the same or similar functions and effects as those according to the first embodiment, and the description thereof is omitted.

Second Embodiment

Figure 7:
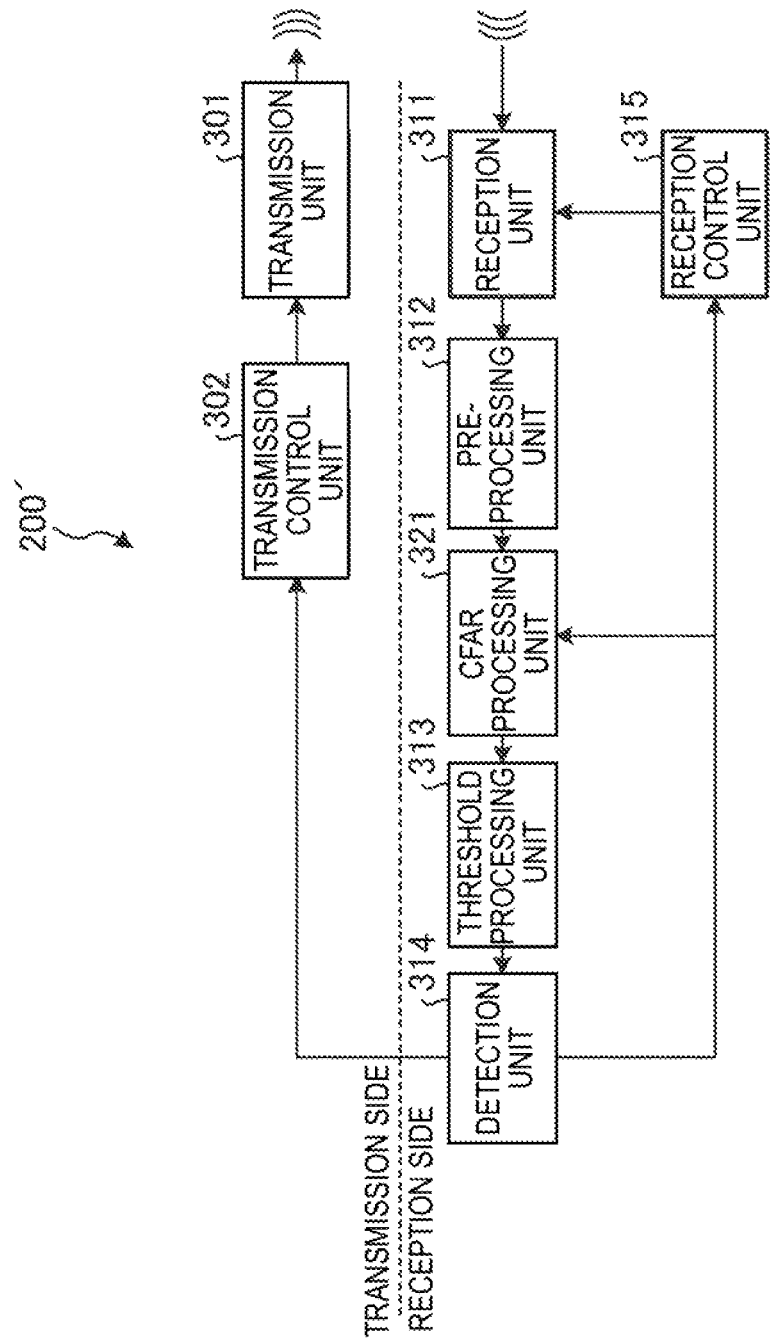
FIG. 7 is a block diagram showing an example of a function configuration of an object detection device according to a second embodiment.

FIG. 7 is a block diagram showing an example of a function configuration of an object detection device 200' according to a second embodiment. The object detection device 200' according to the present embodiment is different from that according to the first embodiment in that the object detection device 200' optimizes CFAR processing based on a detection result of the object. The object detection device 200' according to the present embodiment includes a CFAR processing unit 321 as a reception side configuration in addition to the configuration of the object detection device 200 according to the first embodiment shown in FIG. 4.

The CFAR processing unit 321 generates a difference signal by performing CFAR processing on the envelope curve generated by the pre-processing unit 312. The CFAR processing is, as an outline, processing of generating a difference signal indicating a difference between a value (signal level) of the envelope curve and an average value of the value of the envelope curve in order to reduce clutter contained in the envelope curve. A CFAR processing unit 426 executes the CFAR processing, so that the CFAR processing unit 426 samples the value of the envelope curve corresponding to the reception wave, and generates a difference signal based on a difference between the value of one sample corresponding to the reception wave received at a certain detection timing and an average value of values of a plurality of samples corresponding to the reception wave received in at least one of a first moving average time and a second moving average time. The first moving average time and the second moving average time are predetermined time lengths before and after the detection timing.

It is considered that the CFAR processing include a plurality of pieces of processing having different properties, such as cell averaging constant false alarm rate (CA-CFAR) processing, greatest of constant false alarm rate (GO-CFAR) processing, and smallest of constant false alarm rate (SO-CFAR) processing. The CA-CFAR processing is processing of generating a difference signal based on a difference between a value of one sample corresponding to a reception wave received at a certain detection timing and an average value of values of a plurality of samples corresponding to reception waves received in both the first moving average time and the second moving average time. The GO-CFAR processing is processing of generating a difference signal based on a difference between a value of one sample corresponding to a reception wave received at a certain detection timing and a greater one of average values which are an average value of values of a plurality of samples corresponding to reception waves received in the first moving average time and an average value of values of a plurality of samples corresponding to reception waves received in the second moving average time. The SO-CFAR processing is processing of still painting a difference signal based on a difference between a value of one sample corresponding to a reception wave received at a certain detection timing and a smaller one of the average values which are the average value of values of a plurality of samples corresponding to reception waves received in the first moving average time and the average value of values of a plurality of samples corresponding to reception waves received in the second moving average time.

The CFAR processing unit 321 according to the present embodiment sets a moving average time in the CFAR processing based on the detection result by the detection unit 314. Specifically, the CFAR processing unit 321 shortens the moving average time as the distance (TOF) of the detected object increases. Such a specific method for achieving a setting of the moving average time is not to be specifically limited, and, for example, the moving average time in a case where the TOF (distance) corresponding to the object is larger than the threshold may be set to be shorter than the moving average time in a case where the TOF is the threshold or smaller. By such processing, when the object is present at a relatively long distance or when the object is not present within the detectable range, the processing time required for the CFAR processing can be shortened. When the moving average time is shortened, the number of samples is reduced and the effect of removing clutter is reduced. However, when the object is present at a relatively long distance, or when the object is not present within the detectable range, the effect of removing clutter is often not needed at a fairly high level. Accordingly, by shortening the moving average time as the distance to the object increases as described above, the waste of processing time required for the CFAR processing can be reduced.

The threshold processing unit 313 according to the present embodiment compares the value of the difference signal generated by the CFAR processing unit 321 with the threshold, and determines whether identification information of the transmission wave and identification information of the reception wave are similar to each other at a predetermined level or higher based on a comparison result.

Based on a processing result by the threshold processing unit 313, similar as in the first embodiment, the detection unit 314 specifies the timing at which the similarity between the transmission wave and the reception wave has the predetermined level or higher, that is, the timing (for example, the timing t4 in FIG. 2) at which the signal level of the reception wave reaches the peak exceeding the threshold value, and detects the distance to the object (including the presence or absence of the object) according to the TOF method.

Figure 8:
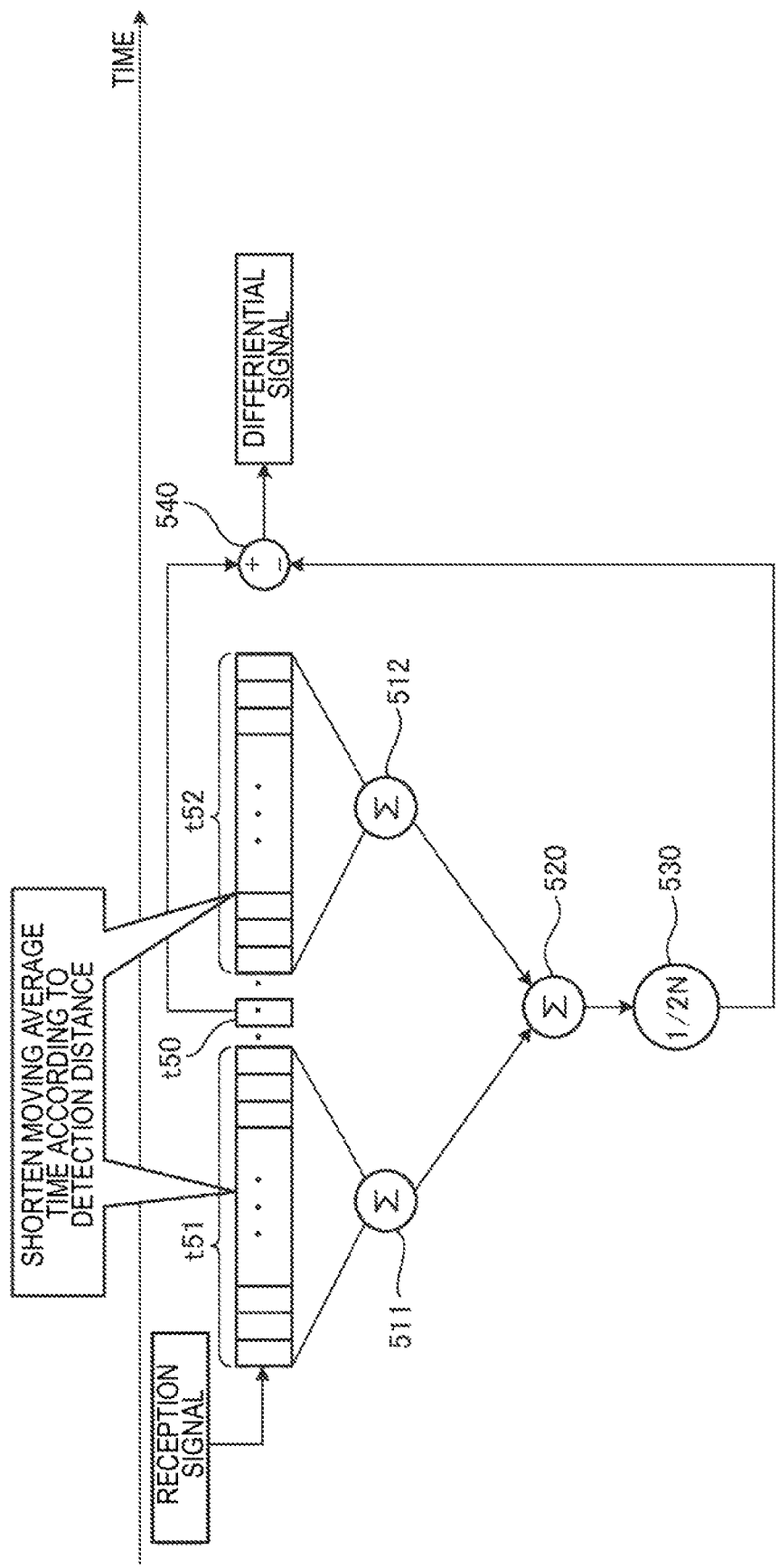
FIG. 8 is a diagram schematically showing an example of CFAR processing according to the second embodiment.

FIG. 8 is a diagram schematically showing the example of the CFAR processing according to the second embodiment. In the CFAR process exemplified in FIG. 8, first, the reception signal (the signal corresponding to the envelope curve generated by the pre-processing unit 312) is sampled at predetermined time intervals. An arithmetic unit 511 of the CFAR processing unit 321 calculates a sum of values for N samples corresponding to the reception waves received at a first moving average time t51 presenting before the detection timing t50. An arithmetic unit 512 of the CFAR processing unit 321 calculates a sum of values for N samples corresponding to the reception waves received at a second moving average time t52 presenting after the detection timing t50. An arithmetic unit 520 of the CFAR processing unit 321 adds arithmetic results of the arithmetic units 511 and 512. An arithmetic unit 530 of the CFAR processing unit 321 divides the arithmetic result of the arithmetic unit 520 by 2N which is a sum of the sample number N at the first moving average time t51 and the sample number N at the second moving average time t52, and calculates an average value of both of the first moving average time t51 and the second moving average time t52. Then, an arithmetic unit 540 of the CFAR processing unit 321 subtracts the average value serving as the arithmetic result of the arithmetic unit 530 from the value corresponding to the detection timing t50 and generates the difference signal.

Figure 9:
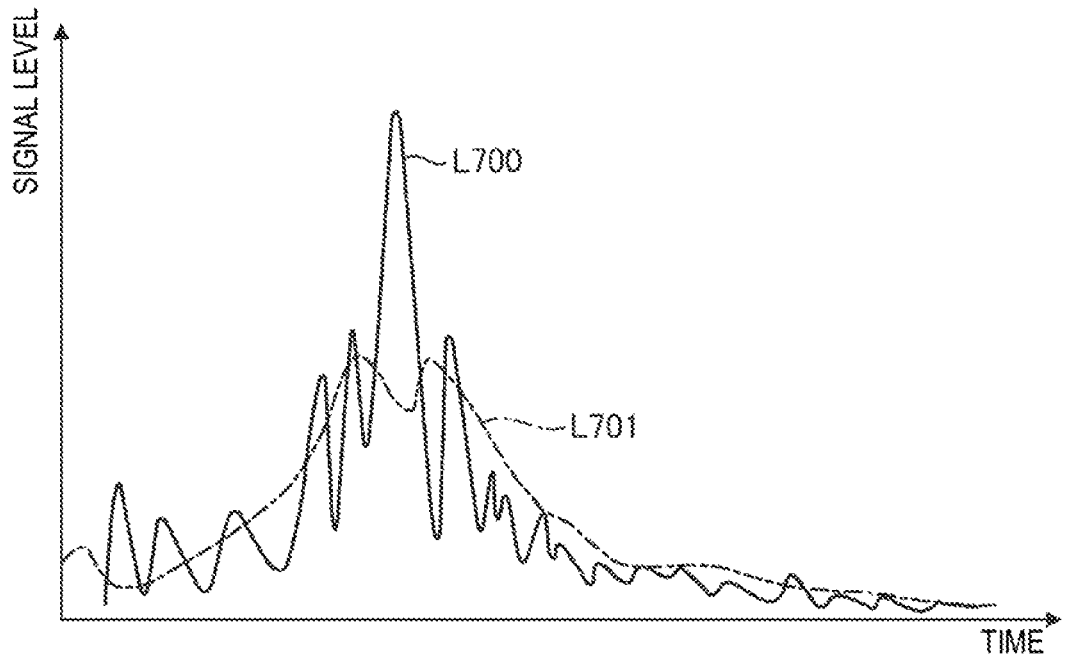
FIG. 9 shows an example of a signal which is a source of a difference signal in the CFAR processing according to the second embodiment.

FIG. 9 shows an example of a signal which is a source of the difference signal in the CFAR processing according to the second embodiment.

In the example shown in FIG. 9, a solid line L700 shows a value of the envelope curve, specifically, a temporal change of a value (signal level) of a signal input to a + side of the arithmetic unit 540 for each detection timing t50 in the example shown in FIG. 8. A one-dot chain line L701 shows an average value calculated in the CFAR processing, specifically, a temporal change of a value of a signal input to a − side of the arithmetic unit 540 in the example shown in FIG. 8.

When the CFAR processing is executed, the difference signal at each time is acquired by subtracting the value of the signal indicated by the one-dot chain line L701 from the value of the signal indicated by the solid line L700 at each time. In the present embodiment, the difference signal is processed such that the value of the difference signal is not a negative value and is always a value of zero or more. Therefore, for example, the value of the difference signal in the section in which the value indicated by the one-dot chain line L701 is larger than the value of the signal indicated by the solid line L700 is calculated as zero, and not as a negative value. Needless to say, in the section where the value of the signal indicated by the solid line L700 is equal to or less than the value indicated by the one-dot chain line L701, the value of the difference signal is calculated as a value of zero or more.

Figure 10:
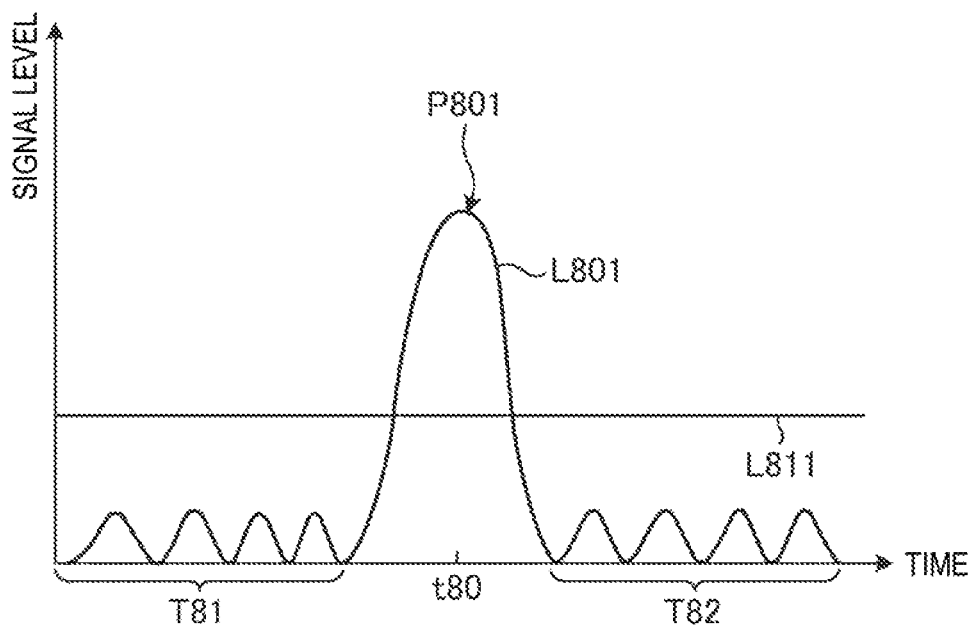
FIG. 10 shows an example of the difference signal obtained as a result of the CFAR processing according to the second embodiment.

FIG. 10 shows an example of the difference signal obtained as a result of the CFAR processing according to the second embodiment.

In the example shown in FIG. 10, a solid line L801 shows an example of the temporal change of the value of the difference signal. As shown by the solid line L801, the value of the difference signal reaches a peak P801 that exceeds a threshold L811 at a certain time t80, and fluctuates in a value range smaller than the threshold L811 in periods T81 and T82 before and after the time t80.

The time t80 corresponds to a timing (timing t4 shown in FIG. 3) at which the signal level of the reception wave reflected by the object to be detected reaches the peak. The timing is extracted as a result obtained by reducing a clutter by the CFAR processing. The periods T81 and T82 correspond to a period in which a clutter is detected. The clutter is caused by a reflection by a road surface and the like, and is reduced by the CFAR processing.

By the above processing, the time t80 (TOF) at which the peak P801 corresponding to the object to be detected is reached can be detected accurately without detecting the periods T81 and T82 corresponding to the clutter.

Figure 11:
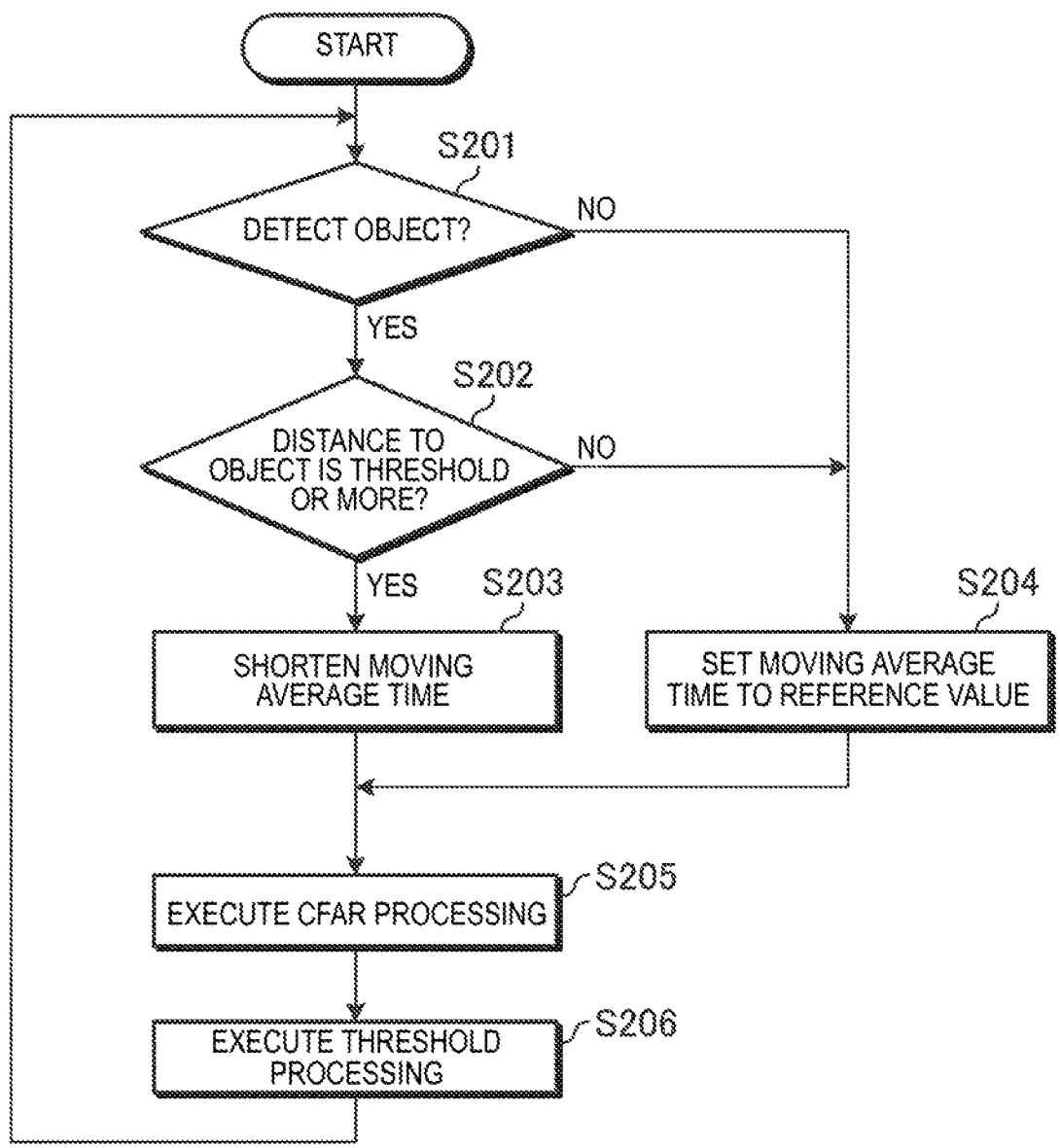
FIG. 11 is a flowchart showing an example of processing of the object detection device according to the second embodiment.

FIG. 11 is a flowchart showing an example of processing of the object detection device 200' according to the second embodiment. The flowchart exemplified in FIG. 11 shows the characteristics of the processing performed by the CFAR processing unit 321, and the processing (setting of the transmission interval and the measurement time, and the like) related to the transmission control unit 302 and the reception control unit 315 is omitted (see steps S102 to S106 in FIG. 6 for the processing related to the transmission control unit 302 and the reception control unit 315).

When the detection unit 314 detects an object (TOF corresponding to the object) (S201: Yes), the CFAR processing unit 321 determines whether the distance to the object (TOF) is equal to or greater than the threshold (S202). When the distance to the object is equal to or greater than the threshold (S202: Yes), the CFAR processing unit 321 sets the first moving average time t51 and the second moving average time t52 to be shorter than the reference value (S203). On the other hand, when the distance to the object is not equal to or greater than the threshold (smaller than the threshold) (S202: No), the CFAR processing unit 321 sets the first moving average time t51 and the second moving average time t52 to the reference value (S204).

The CFAR processing unit 321 executes the CFAR processing based on the shortened first moving average time t51 and second moving average time t52 that are set in step S203, or the first moving average time t51 and second moving average time t52 that serve as reference values and are set in step S204 (S205). After that, the threshold processing unit 313 executes the threshold processing on the difference signal generated after the CFAR processing performed by the CFAR processing unit 321 (S206). The detection unit 314 detects the object based on the result of the threshold processing performed by the threshold processing unit 313 (S201).

According to the embodiment described above, the moving average time in the CFAR processing can be optimized according to the distance to the object. By performing such CFAR processing together with the optimization of the transmission interval and the measurement time performed by the transmission control unit 302 and the reception control unit 315 described in the first embodiment, the detection cycle for detection of the object can be further optimized.

Third Embodiment

FIG. 12 is a block diagram showing an example of a function configuration of an object detection device 200" according to the third embodiment. The object detection device 200" according to the present embodiment is different from the object detection device 200' according to the second embodiment shown in FIG. 7 in that the transmission control unit 302 and the reception control unit 315 are not provided. That is, the object detection device 200" according to the present embodiment does not optimize the transmission interval and the measurement time by the transmission control unit 302 and the reception control unit 315, and optimizes the moving average time by the CFAR processing unit 321. According to such a configuration, since waste of the processing time required for the CFAR processing can be reduced, an effect of optimizing the detection cycle for detection of the object can be attained.

An object detection device as an example of this disclosure includes: a transmission unit configured to transmit a transmission wave; a reception unit configured to receive a reception wave, which is the transmission wave reflected by and returned from an object, until a predetermined measurement time elapses after the transmission wave is transmitted; a detection unit configured to detect the object based on distance information based on the reception wave received by the reception unit; and a reception control unit configured to set the measurement time after the detection of the object to be shorter than the measurement time after a non-detection of the object.

According to the above configuration, the measurement time when the object is detected is reduced, and the detection cycle is optimized. For example, in a system or the like for detection of an obstacle, it may be sufficient if the closest present object can be detected, and it is often less necessary to extend a detection range to a region farther than the detected object. In such a case, as the above configuration, detection accuracy in a region closer than the detected object can be improved by reducing the measurement time for detection of a region farther than the detected object and accelerating the detection cycle.

In the object detection device as the example, the reception control unit may set the measurement time to a time corresponding to a position that is farther than a distance to the closest present object by a predetermined distance.

According to the above configuration, a region to be detected can be fixed to a region closer than a peripheral region of the detected object.

The object detection device as the example may further include: a transmission control unit configured to set a transmission interval from a transmission of the transmission wave to a next transmission of the transmission wave, and set the transmission interval after the detection of the object to be shorter than the transmission interval after the non-detection of the object, in which the transmission unit may transmit the transmission wave based on the transmission interval.

According to the above, by reducing not only the measurement time but also the transmission interval when the object is detected, the detection cycle can be effectively optimized.

The object detection device as the example may further include a CFAR processing unit configured to perform CFAR processing using an average value of the values of a plurality of signals corresponding to a predetermined moving average time for a signal corresponding to the reception wave received by the reception unit, and shorten the moving average time as a distance to the detected object increases.

According to the above configuration, the moving average time can be reduced when the distance to the detected object is relatively large, and the processing time required for the CFAR processing is shortened. In a region where the distance to the object is relatively large, a clutter removing effect attained by the CFAR processing is often not required to be such a high level. Therefore, according to the above configuration, by shortening the moving average time as the distance to the detected object increases, the detection cycle can be optimized.

An object detection device as another example of this disclosure includes: a transmission unit configured to transmit a transmission wave; a reception unit configured to receive a reception wave which is the transmission wave reflected by and returned from an object; a detection unit configured to detect the object based on distance information based on the reception wave received by the reception unit; and a CFAR processing unit configured to perform CFAR processing using an average value of a plurality of signal values corresponding to a predetermined moving average time for a signal corresponding to the reception wave received by the reception unit and set the moving average time after a detection of the object to be shorter than a moving average time after a non-detection of the object.

According to the above configuration, the moving average time is reduced when the distance to the detected object is relatively large, and the processing time required for the CFAR processing is shortened. In the region where the distance to the object is relatively large, the clutter removing effect attained by the CFAR processing is often not required to be such a high level. Therefore, according to the above configuration, by shortening the moving average time as the distance to the detected object increases, the detection cycle can be optimized.

The object detection device as the another example may further include: a reception control unit configured to set a predetermined measurement time from a transmission of the transmission wave, and set the measurement time after the detection of the object to be shorter than the measurement time after a non-detection of the object, in which the reception unit receives the reception wave until the measurement time elapses after the transmission wave is transmitted.

According to the above configuration, the measurement time when the object is detected is reduced, and the detection cycle is optimized. For example, in the system or the like for detection of the obstacle, it may be sufficient if the closest present object can be detected, and it is often less necessary to extend the detection range to the region farther than the detected object. In such a case, as the above configuration, detection accuracy in a region closer than the detected object can be improved by reducing the measurement time for detection of the region farther than the detected object and accelerating the detection cycle.

In the object detection device as the another example, the reception control unit may set the measurement time to a time corresponding to a position that is farther than a distance to the closest present object by a predetermined distance.

According to the above configuration, the region to be detected can be fixed to the region closer than the peripheral region of the detected object.

The object detection device as the another example may further include: a transmission control unit configured to set a transmission interval which is a time from a transmission of the transmission wave to a next transmission of the transmission wave and set the transmission interval after the detection of the object to be shorter than the transmission interval after the non-detection of the object, in which the transmission unit may transmit the transmission wave based on the transmission interval.

According to the above, by reducing not only the measurement time but also the transmission interval when the object is detected, the detection cycle can be effectively optimized.

While the embodiments disclosed here have been described, the above-described embodiments have been presented by way of example only, and are not intended to limit the scope of this disclosure. The above-described novel embodiments may be embodied in a variety of forms, and various omissions, substitutions and changes may be made without departing from the spirit of this disclosure. The above-described embodiments are covered by the scope and spirit of this disclosure, and are covered in the inventions described in the scope of the claims and the equivalent range with the inventions described in the scope of the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
    a transmitter configured to transmit a transmission wave;
    a receiver configured to receive a reception wave, which is the transmission wave reflected by and returned from an object, until a predetermined measurement time elapses after the transmission wave is transmitted;
    a detector configured to detect the object based on distance information based on the reception wave received by the receiver; and
    a reception controller configured to set a measurement time after a detection of the object to be shorter than a measurement time after a non-detection of the object.

2. The object detection device according to claim 1, wherein
    the reception controller sets the measurement time after the detection of the object to a time corresponding to a position that is farther than a distance to a closest present object by a predetermined distance.

3. The object detection device according to claim 1, further comprising:
    a transmission controller configured to set a transmission interval from a transmission of the transmission wave to a next transmission of the transmission wave, and set the transmission interval after the detection of the object to be shorter than the transmission interval after the non-detection of the object, wherein
    the transmitter transmits the transmission wave based on the transmission interval.

4. The object detection device according to claim 1, further comprising:
    a CFAR processor configured to perform CFAR processing based on a predetermined moving average time for a signal corresponding to the reception wave received by the receiver, and shorten the predetermined moving average time as a distance to the detected object increases.

5. An object detection device, comprising:
    a transmitter configured to transmit a transmission wave;

a receiver configured to receive a reception wave which is the transmission wave reflected by and returned from an object;

a detector configured to detect the object based on distance information based on the reception wave received by the receiver; and a CFAR processor configured to perform CFAR processing based on a predetermined moving average time for a signal corresponding to the reception wave received by the receiver, and shorten the predetermined moving average time as a distance to the detected object increases.

6. The object detection device according to claim 5, further comprising:

a reception controller configured to set a predetermined measurement time from a transmission of the transmission wave, and set a measurement time after a detection of the object to be shorter than a measurement time after a non-detection of the object, wherein the receiver receives the reception wave until the set measurement elapses after the transmission wave is transmitted.

7. The object detection device according to claim 6, wherein the reception controller sets the measurement time after the detection of the object to a time corresponding to a position that is farther than a distance to a closest present object by a predetermined distance.

8. The object detection device according to claim 6, further comprising:

a transmission controller configured to set a transmission interval which is a time from a transmission of the transmission wave to a next transmission of the transmission wave, and set the transmission interval after the detection of the object to be shorter than the transmission interval after the non-detection of the object, wherein the transmitter transmits the transmission wave based on the transmission interval.

\* \* \* \* \*